US007632342B2

(12) United States Patent
Nakanoya et al.

(10) Patent No.: US 7,632,342 B2
(45) Date of Patent: Dec. 15, 2009

(54) VALVE OUTLET CAP FOR TOXIC-GAS CONTAINER

(75) Inventors: Tsutomu Nakanoya, Machida (JP); Maki Egami, Machida (JP); Ryota Tada, Machida (JP)

(73) Assignee: Takachiho Chemical Industrial Co., Ltd., Tokyo (JP)

( * ) Notice: Subject to any disclaimer, the term of this patent is extended or adjusted under 35 U.S.C. 154(b) by 388 days.

(21) Appl. No.: 11/643,679

(22) Filed: Dec. 22, 2006

(65) Prior Publication Data

US 2007/0101864 A1 May 10, 2007

Related U.S. Application Data

(63) Continuation of application No. PCT/JP2004/013618, filed on Sep. 17, 2004.

(30) Foreign Application Priority Data

Jun. 24, 2004 (JP) ............................ 2004-186189

(51) Int. Cl.
*F17C 13/04* (2006.01)
*B01D 53/04* (2006.01)

(52) U.S. Cl. ......................... 96/134; 55/385.4; 252/184

(58) Field of Classification Search ................... 96/108; 55/385.4; 422/164; 252/181.1, 181.3, 181.6, 252/194, 184; 222/3; 206/6
See application file for complete search history.

(56) References Cited

U.S. PATENT DOCUMENTS

| | | | | |
|---|---|---|---|---|
| 2,317,882 | A * | 4/1943 | Boesel | 96/148 |
| 4,287,995 | A * | 9/1981 | Moriya | 215/228 |
| 4,350,508 | A * | 9/1982 | Santoro et al. | 96/117.5 |
| 4,421,235 | A * | 12/1983 | Moriya | 206/524.2 |
| 5,529,841 | A * | 6/1996 | Neihof | 428/328 |
| 5,891,223 | A * | 4/1999 | Shaw et al. | 96/134 |
| 6,708,844 | B2 * | 3/2004 | Lim et al. | 222/3 |
| 6,986,807 | B2 * | 1/2006 | Brunk | 96/147 |

FOREIGN PATENT DOCUMENTS

| | | |
|---|---|---|
| JP | 59-57362 | 4/1984 |
| JP | 60-163256 | 10/1985 |
| JP | 05-231598 | 9/1993 |
| JP | 07-198097 | 8/1995 |
| JP | 2002-355529 | 12/2002 |
| JP | 2003-126647 | 5/2003 |

OTHER PUBLICATIONS

JP 07-198097 Raw Machine Translation, published Aug. 1995.*

* cited by examiner

*Primary Examiner*—Frank M Lawrence
(74) *Attorney, Agent, or Firm*—Jacobson Holman PLLC

(57) ABSTRACT

The present invention provides an outlet cap adapted to removably attached to the gas outlet of a gas discharge passageway in an on-off valve provided on a toxic gas containing container, the outlet cap comprising a bottom wall, a peripheral wall extending from the bottom wall and a gasket located on an inner surface of the bottom wall for sealing the gas outlet, the gasket including a gas absorbing means which is made of a material which does not chemically react with the toxic gas contained in the toxic gas container to degrade the sealing property of the gasket, the toxic-gas absorbing means being exposed to the gas discharge passageway when the outlet cap is attached to the gas outlet.

8 Claims, 2 Drawing Sheets

VALVE OUTLET CAP FOR TOXIC-GAS CONTAINER

This is a continuation of PCT/JP2004/013618 filed 17 Sep. 2004 and published in Japanese.

BACKGROUND OF THE INVENTION

1. Technical Field

The present invention relates to an outlet cap adapted to be attached to the outlet of an on-off valve of a container containing a toxic gas.

2. Background Art

In production of semi-conductor devices such as LSI or ultra LSI, a toxic gas has been used at certain steps. For example, the process of conducting a thin-film deposition on a silicon wafer substrate consists of implanting or injecting a toxic gas such as arsine, phosphine, boron trifluoride as an ion source into semiconductors through an ion implanting apparatus to produce n-type and p-type semiconductors. Further, the process of dry-etching without the use of liquid such as etchant or solvent uses a toxic gas such as nitrogen trifluoride or hydrogen chloride as dry-etching agent.

Typically, a toxic gas is charged into a gas bomb or gas bottle made of iron or aluminum in order to put it on the market. Upon charging the toxic gas into the gas bottle, an outlet cap may be attached to the gas outlet of an on-off valve provided on the gas bottle.

Prior to the attachment of this outlet cap, the toxic gas which could exist within an interior space of the on-off valve must be exhausted for example, using a vacuum pump and then, the interior space of the on-off valve may be charged with an ambient air, nitrogen or the like. This is because if the outlet cap is removed from the gas outlet of the on-off valve for piping installation while the toxic gas could remain inside the on-off valve, the toxic gas will adversely diffuse from the on-off valve to the environment.

As a practical matter, however, it is difficult to perfectly empty the on-off valve of the toxic gas by the vacuum pump or the like. Further, the toxic gas may be temporarily adsorbed onto the inner metallic surfaces of the on-off valve defining the internal space thereof. In such a case, even if the toxic gas has been completely removed from the internal space of the on-off valve by the vacuum pump, the adsorbed toxic gas may be gradually released, thereby causing the internal space of the on-off valve to be filled with the toxic gas.

Therefore, the present invention was made to solve the problems and has its object to provide an outlet cap which can remove the toxic gas existing in the internal space of the on-off valve in the gas bottle.

BRIEF SUMMARY OF THE INVENTION

To this end, the present invention provides an outlet cap adapted to removably attached to the gas outlet of a gas discharge passageway in an on-off valve provided on a container containing a toxic gas, said outlet cap comprising a bottom wall, a peripheral wall extending from the bottom wall, a gasket located on an inner surface of said bottom wall for sealing the gas outlet, said gasket being made of a material which does not chemically react with the toxic gas contained in the toxic-gas container to degrade the sealing property of the gasket, and a toxic-gas absorbing means attached to the gasket, said toxic-gas absorbing means being exposed to said gas discharge passageway when said outlet cap is attached to said gas outlet.

According to the present invention, it is preferred that the gasket includes a through-hole or recess centrally formed therein, the toxic-gas absorbing means being disposed in the through-hole or recess of the gasket, the toxic-gas absorbing means comprising a toxic-gas absorbent made of a material which can chemically react with the toxic gas to take and consume the toxic gas to thereby produce a solid product, and a barrier member of a material which is permeable to the toxic gas and impermeable to the toxic-gas absorbent and the solid product, the barrier member being disposed in the through-hole or recess of the gasket on the side opposite to the bottom wall and adjacent to the toxic-gas absorbent.

It is also preferred that the toxic-gas absorbent includes a main reacting component which is selected from the group consisting of cupric hydroxide, manganese oxide, copper oxide, manganese carbonate and copper carbonate.

According to the present invention, it is further preferred that the toxic-gas absorbent includes a material absorbing the toxic gas and moisture. It is still further preferred that the gasket includes a through-hole or recess centrally formed therein, the toxic-gas absorbing means being disposed in the through-hole or recess of the gasket, the toxic-gas absorbing means comprising a toxic-gas adsorbent which is formed by a material absorbing at least the toxic gas and a barrier member which is permeable to the toxic gas, the barrier member being disposed in the through-hole or recess of the gasket on the side opposite to the bottom wall and adjacent to the toxic-gas absorbent.

Since the outlet cap of the present invention has the toxic gas absorbing means which can be exposed to the gas discharge passageway when the outlet cap is attached to the gas outlet, the toxic gas existing in the gas discharge passageway can be absorbed onto the toxic-gas absorbing means. Even when the outlet cap is removed from the gas outlet of the gas discharge passageway in the on-off valve, therefore, the toxic gas will be prevented from diffusing to the ambient environment. Further, since the toxic-gas absorbing means is mounted on the outlet cap according to the present invention, the toxic-gas absorbing means can be removed from the gas discharge passageway of the on-off valve only by removing the outlet cap from the gas outlet of the gas discharge passageway in the on-off valve. As a result, another operation for independently removing the toxic-gas absorbing means will not be required.

DETAILED DESCRIPTION OF THE INVENTION

Certain embodiments of the present invention will now be described with reference to the accompanying drawings.

Figure 1:
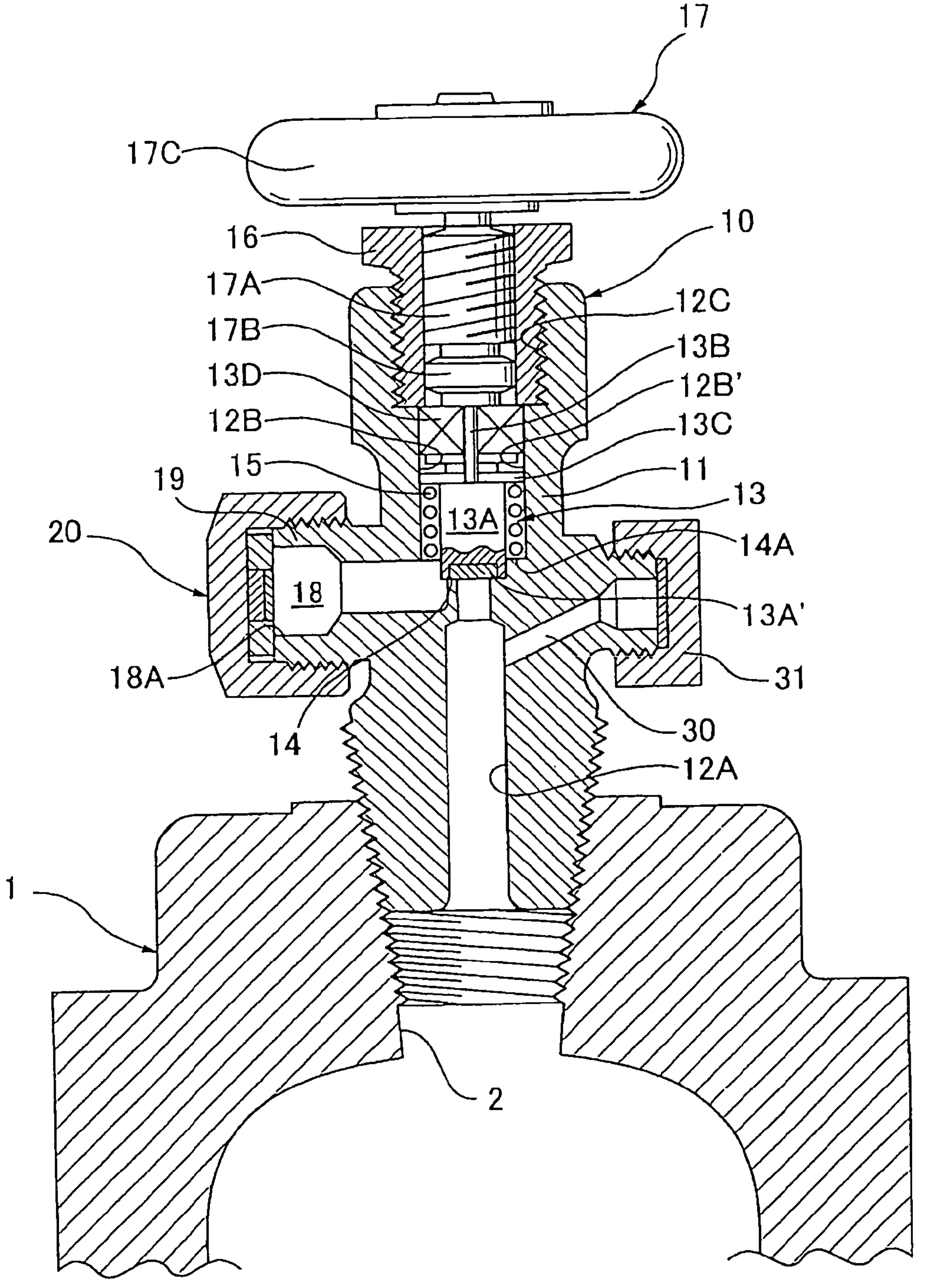
FIG. 1 is a partially enlarged cross-sectional view of a gas bottle to which an outlet cap according to one embodiment of the present invention is attached.

Referring to FIG. 1, there is shown a portion of a gas bottle 1 for containing a toxic gas together with an on-off valve 10 and an outlet cap 20, in a partial cross-section view.

The gas bottle 1 is adapted to contain various toxic gases such as arsine, phosphine, boron trifluoride, nitrogen trifluoride and hydrogen. The gas bottle 1 is provided with an internally threaded opening 2 formed in the top wall thereof.

The on-off valve 10 comprises a valve body 11, the lower portion of which is externally threaded. The valve body 11 can be mounted on the gas bottle 1 by threadedly engaging the external thread of the valve body 11 with the internal thread of the opening 2.

The valve body 11 also includes an axial or vertical passageway formed therethrough, which may extend from the top end to the bottom end of the valve body 11. This passageway comprises a lower reduced diameter portion 12A in communication with the interior of the gas bottle 1 when the valve body 11 is attached to the opening 2 of the gas bottle 1, an intermediate portion 12B following this lower reduced diameter passageway 12A, and an upper enlarged diameter portion 12C following the intermediate passageway portion 12B.

A shoulder 14 is formed between the lower reduced diameter portion 12A and the middle portion 12B of the passageway. An additional enlarged diameter portion 12B' is formed in the middle portion 12B of the passageway slightly above the shoulder 14 to form another shoulder 14A.

A seat assembly 13 is disposed in the middle passageway portion 12B. The seat assembly 13 has a cylindrical shutoff member 13A which can seat on the shoulder 14. The bottom end of the shutoff member 13A includes a circular sealing member 13A' located at a region where the bottom end of the shutoff member 13A abuts against the top edge of the middle passageway portion 12B. The sealing member 13A' may be formed of a resin of trifluoride, for example. The shutoff member 13A also has a pin 13B extending upwardly therefrom. The pin 13B fixedly supports a spring support member 13C adjacent to the shutoff member 13A that has a diameter larger than that of the shutoff member 13A. A coil spring 15 is located between the spring support member 13C and the shoulder 14A so that the seat assembly 13 may be biased upward within the middle passageway portion 12B by the coil spring 15.

The pin 13B also fixedly supports a pair of ring-shaped member above the spring support member 13C. A cylindrical sealing member 13D is fixedly mounted on the pin 13B between these ring-shaped members. The sealing member 13D always abuts against the inner wall of the middle passageway portion 12B (and the inner wall of the additional enlarged diameter portion 12B') so as to prevent the toxic gas in the gas bottle 1 from leaking into the upper enlarged diameter portion 12C of the passageway.

The upper enlarged diameter passageway portion 12C may be internally threaded. The on-off valve 10 further includes a sleeve 16. The sleeve 16 includes an external thread formed externally on the lower portion thereof that is threadedly engaged by the internal thread in the upper diameter-enlarged passageway 12C. The sleeve 16 has an internal thread formed in the inner wall thereof at the upper portion.

The on-off valve 10 further includes a handle 17. The handle 17 comprises a rotating member 17A including an external thread formed therein and threadedly engageable with the internal thread of the sleeve 16, an abutment member 17B extending downward from the rotating member 17A, and a handle member 17C located on the top of the rotating member 17A. As the handle member 17C is rotated to move the handle member 17 downward within the sleeve 16, the abutment member 17B abuts against the sealing member 13D of the seat assembly 13 and moves the whole seat assembly 13 downward against the biasing force of the coil spring 15 until the shutoff member 13A seats on the shoulder 14 to close the top opening of the lower diameter-reduced passageway 12A.

The valve body 11 further includes a horizontal passageway 18 formed therein. The inner end of the horizontal passageway 18 is located to communicate with the vertical passageway (middle passageway 12B) at the step 14 while the outer end of the horizontal passageway 18 is opened at the outer wall of the valve body 11 to define a gas outlet 18A. The valve body 11 has a portion at 19 which extends outwardly therefrom to define a peripheral wall for the horizontal passageway. The outwardly extending portion 19 includes an external thread formed thereon at the outer end thereof so that the outlet cap 20 and an associated conduit can be mounted on the valve body 11.

Figure 2:
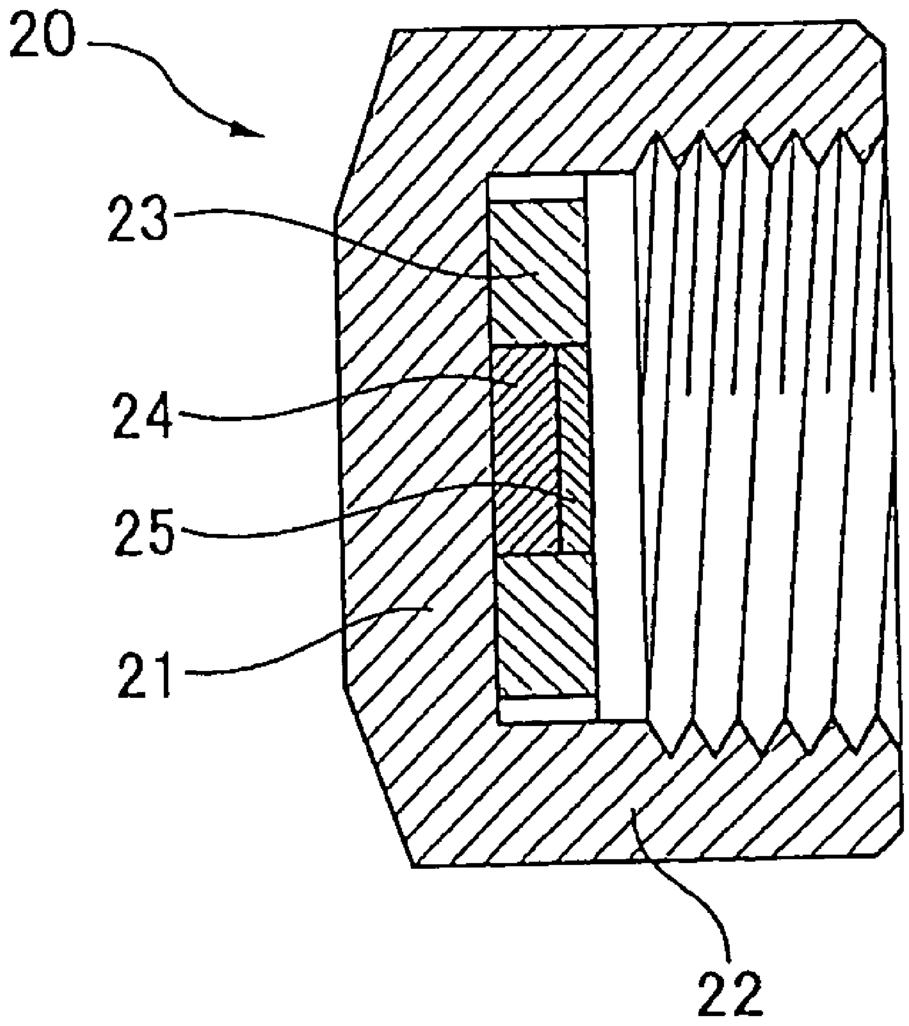
FIG. 2 is an enlarged cross-sectional view of the outlet cap shown in FIG. 1.

As best seen from FIG. 2, the outlet cap 20 has a circular bottom 21 and a peripheral wall 22 extending from the periphery of the circular bottom 21. The free end of the peripheral wall 22 includes an internal thread formed therein at the inner wall and threadedly engageable with the external thread of the externally extending portion 19 in the valve body 11.

The circular bottom 21 of the outlet cap 20 internally receives a ring-shaped packing or gasket 23 which includes a central opening (through-hole) formed therethrough. The ring-shaped gasket 23 is sized so that it will abut against the outer end of the externally extending portion 19 when the outlet cap 20 is mounted on (or threadedly engaged by) the externally extending portion 19 of the valve body 11. The ring-shaped gasket 23 may be made of such a material that does not chemically react with the toxic gas contained in the gas bottle 1, and particularly of such a material that will not chemically react with the toxic gas to degrade the sealing function in the gasket. Depending on the toxic gas contained in the gas bottle 1, the material of the gasket 23 may be selected from the group consisting of resins of vinyl chloride, tetrafluoride and trifluoride, and various metals. Although the central opening of the ring-shaped gasket 23 is circular in the illustrated embodiment, it may be of any shape, such as square.

The outlet cap 20 further includes a toxic-gas absorbent 24 received in the central opening of the ring-shaped gasket 23 adjacent to the circular bottom 21, and a barrier member 25 also received in the central opening of the ring-shaped gasket 23 in face-to-face relationship with the toxic-gas absorbent 24.

According to the illustrated embodiment of the present invention, the toxic-gas absorbent 24 functions to chemically react with the toxic gas contained in the gas bottle 1 to take and consume the toxic gas to thereby produce a solid product. For example, if the gas bottle 1 contains arsine gas ($2AsH_3$) or phosphine gas ($2PH_3$) as toxic gas, the toxic-gas absorbent 24 (or the main reacting component thereof) may be made of cupric hydroxide ($3Cu(OH)_2$).

If the arsine gas is brought into contact with the toxic-gas absorbent 24 of cupric hydroxide, a reaction as shown by the following formula (1) will occur. If the phosphine gas is bought into contact with the toxic-gas absorbent 24 of cupric hydroxide, such a reaction as shown by the following formula (2) will occur. In any case, the toxic gas will be consumed to produce a solid product (together with water).

$$2AsH_3+3Cu(OH)_2\rightarrow Cu_3As_2+6H_2O \quad (1)$$

$$2PH_3+3Cu(OH)_2\rightarrow Cu_3P_2+6H_2O \quad (2)$$

The barrier member 25 is permeable to the toxic gas and impermeable to the toxic-gas absorbent 24 and the solid product produced by the toxic-gas absorbent 24 (e.g., $Cu_3As2$ or $Cu_3P2$ as described). It is preferred that the barrier member 25 has some degrees of strength. For example, the barrier member may be preferably formed by a sintered plate of stainless steel.

Referring again to FIG. 1, the valve body 11 is also formed with a passageway 30 which extends from the lower reduced diameter passageway portion 12A and is opened at the outer wall of the valve body 11. The passageway 30 is used to release the gas in the gas bottle 1 in au urgent manner in the event of the abnormal increase in the pressure within the gas bottle 1. The passageway 30 is sealed by a gasketed cap 31. It is not intended that the cap 31 is ordinarily opened and closed. Therefore, the passageway 30 does not relate directly to the present invention.

The gas bottle 1 may be used in the same manner as in the conventional gas bottles. More particularly, the outlet cap 20 is threadedly disengaged and removed from the externally extending portion 19 of the valve body 11. Instead, a predetermined connecting piping is fluidly connected with the externally extending portion 19. After completion of all the piping installation, the handle member 17C can be rotated to move the abutment member 17B upward thereby bias the seat assembly 13 upward under the biasing force of the coil spring 15. Thus, the shutoff member 13A is separated from the top opening of the lower diameter-reduced passageway 12A to connect the lower diameter-reduced passageway 12A with the horizontal passageway 18 (or gas outlet 18A). As a result, the gas in the gas bottle 1 is expelled through the gas outlet 18A.

Operation of the outlet cap 20 will be described below. With the on-off valve 10 being in its shutoff position or with the top opening of the lower reduced diameter portion 12A of passageway being closed by the shutoff member 13A while the toxic gas has not been completely removed even by the vacuuming operation and remains in the internal space or horizontal passageway 18 of the on-off valve or while the toxic gas has been temporarily adsorbed by the inner peripheral wall of the horizontal passageway 18, but is gradually released therefrom, the toxic gas permeates through the barrier member 25 of the outlet cap 20 to the toxic-gas absorbent 24. The toxic-gas absorbent 24 then absorbs the toxic gas, thereby resulting in the formation of a solid product. The solid product cannot move through the barrier member 25. Consequently, the toxic gas will not diffuse externally from the on-off valve 10 even when the outlet cap 20 is removed from the on-off valve 10.

The present invention is not limited to the aforementioned embodiment, but may be embodied in other forms.

While the gasket 23 is in the form of ring and has its central opening or through-hole in the illustrated embodiment, for example, the gasket 23 may have a recess closed on the side thereof facing the circular bottom 21. In this case, the recess will receive the toxic-gas absorbent 24 and the barrier member 25.

Further, the toxic-gas absorbent 24 in the aforementioned embodiment may include a material that can absorb at least moisture and preferably the toxic gas in addition to the moisture, such as molecular sieve, alumina or activated charcoal. This example is advantageous in that the toxic-gas absorbent 24 can hold water produced by its reaction with the toxic gas. Further, the toxic-gas absorbent 24 for absorbing the toxic gas by the chemical reaction as in the aforementioned embodiment may be replaced, for example, by a toxic-gas adsorbent formed of a material which can absorb at least the toxic gas and preferably moisture in addition to the toxic gas, such as molecular sieve, alumina or active carbon. The toxic-gas adsorbent made of any one of the listed materials is particularly preferred since it can absorb not only the toxic gas, but also any moisture contained in the air within the gas discharge passageway. The moisture contained in the air within the gas discharge passageway may corrode the metallic surface of the gas discharge passageway to produce a corrosion reactant which may in turn degrade the purity of toxic gas when the toxic gas is used. Even in such an example, the barrier member 25 is useful for isolating the toxic-gas adsorbent absorbed the toxic gas.

EXAMPLE

For experiments, there were prepared six outlet caps 20 according to the present invention by producing ring-shaped gaskets 23 of trifluoride resin each having a diameter of 20 mm and a thickness of 2 mm, mounting a toxic-gas absorbent 24 of cupric oxide having a diameter of 8 mm and a thickness of 1 mm and a barrier member 25 formed by a sintered metal plate of stainless steel and having a diameter of 8 mm and a thickness of 1 mm in the central circular opening of each gasket 23 and attaching each gasket 23 comprising such an absorbent 24 and barrier member 25 to the inside of the corresponding circular bottom 21 (so that the toxic-gas absorbent 24 was adjacent to the circular bottom 21) (sample numbers 1-3 and 7-9).

For control, there were prepared six outlet caps from each of which the absorbent 24 and barrier member 25 were omitted (sample numbers 4-6 and 10-12).

Furthermore, there were prepared six containers filled with arsine. To these containers were attached the outlet caps 20 of the present invention (sample numbers 1-3) and the outlet cap for comparison (sample numbers 4-6), respectively. Similarly, there were prepared six containers filled with phosphine. To these phosphine containers were attached the outlet caps 20 of the present invention (sample numbers 7-9) and the outlet cap for comparison (sample numbers 10-12), respectively. Prior to attachment of the outlet caps (sample numbers 1-12) to the respective gas bottles, the interior of the on-off valve in each of the gas bottles was vacuum aspirated.

After one day and one week, the outlet caps (sample numbers 1-12) were removed from the 12 containers and then, the concentration of the toxic gas in the on-off valve of each container was measured by a toxic gas monitor (Model SC-90) made by Riken Keiki. The measurements are summarized in Table 1.

TABLE 1

| Sample No. | Gas contained in Container | Measurements (ppm) after one day | Measurements (ppm) after one week |
|---|---|---|---|
| 1 | Arsine | 0.00 | 0.00 |
| 2 | Arsine | 0.00 | 0.00 |
| 3 | Arsine | 0.00 | 0.00 |
| 4 | Arsine | 0.05 | 0.15 |
| 5 | Arsine | 0.10 | 0.30 |
| 6 | Arsine | 0.15 | 0.30 |
| 7 | Phosphine | 0.00 | 0.00 |
| 8 | Phosphine | 0.00 | 0.00 |
| 9 | Phosphine | 0.00 | 0.00 |
| 10 | Phosphine | 0.20 | Over 0.30 |
| 11 | Phosphine | 0.15 | Over 0.30 |
| 12 | Phosphine | 0.30 | Over 0.30 |

From the aforementioned experimental results, it was confirmed that the outlet caps 20 (sample numbers 1-3 and 7-9) according to the present invention could effectively remove the toxic gas in the on-off valves of the containers.

Visual inspection of the metallic surfaces at the gas outlet of the on-off valves in the gas bottles showed that the metallic surfaces at and adjacent to the gas outlet discolored in the on-off valves to which the outlet caps for comparison (sample numbers 4-6 and 10-12) were attached. However, the metallic surfaces at and adjacent to the gas outlet did not discolor at all in the on-off valves to which the outlet caps according to the present invention (sample numbers 1-3 and 7-9) were attached.

In addition, the chemical reaction between the arsine and phosphine used as toxic gas in the aforementioned experiments and the cupric oxide used as the toxic-gas absorbent 24 are indicated by the following formulas (3) and (4), respectively.

$$2AsH_3+3CuO \rightarrow Cu_3As_2+3H_2O \quad (3)$$

$$2PH_3+3CuO \rightarrow Cu_3P_2+3H_2O \quad (4)$$

INDUSTRIAL APPLICABILITY

The outlet cap according to the present invention can be equally applied to the gas outlet of any other on-off valve for a source of toxic gas other than the container, for example, a stationary source of toxic gas supply associated with piping to the on-off valve.

What is claimed is:

1. An outlet cap adapted to be removably attached to the gas outlet of a gas discharge passageway in an on-off valve provided on a container containing a toxic gas, said outlet cap comprising:

a bottom wall;

a peripheral wall extending from the bottom wall;

a gasket located on an inner surface of said bottom wall for sealing the gas outlet, said gasket being made of a material which does not chemically react with the toxic gas contained in the container to degrade the sealing property of the gasket, and said gasket having a through-hole centrally formed therein; and toxic-gas absorbing means fitted into the through-hole of the gasket, said toxic-gas absorbing means being exposed to said gas discharge passageway when said outlet cap is attached to said gas outlet, wherein the toxic-gas absorbing means consisting of a toxic-gas absorbent made of a material which can chemically react with the toxic gas to take and consume the toxic gas to thereby produce a solid product, and a barrier member which is permeable to the toxic gas and impermeable to the toxic-gas absorbent and the solid product produced, the barrier member being made of a sintered plate of metal and being fitted into the through-hole of the gasket on the side opposite to the bottom wall and adjacent to the toxic-gas absorbent.

2. The outlet cap as claimed in claim 1, wherein the said toxic-gas absorbent has a main reacting component which is selected from the group consisting of cupric hydroxide, manganese oxide, copper oxide, manganese carbonate and copper carbonate.

3. The outlet cap as claimed in claim 2, wherein said toxic-gas absorbent includes a material for adsorbing at least moisture.

4. An outlet cap adapted to be removably attached to the gas outlet of a gas discharge passageway in an on-off valve provided on a container containing a toxic gas, said outlet cap comprising:

a bottom wall;

a peripheral wall extending from the bottom wall;

a gasket located on an inner surface of said bottom wall for sealing the gas outlet, said gasket being made of a material which does not chemically react with the toxic gas contained in the container to degrade the sealing property of the gasket, and said gasket having a through-hole centrally formed therein; and toxic-gas absorbing means fitted into the through-hole of the gasket, said toxic-gas absorbing means being exposed to said gas discharge passageway when said outlet cap is attached to said gas outlet, the toxic-gas absorbing means consisting of a toxic-gas adsorbent which is formed by a material absorbing at least the toxic gas and a barrier member which is permeable to the toxic gas, the barrier member being made of a sintered plate of metal and being fitted into the through-hole of the gasket on the side opposite to the bottom wall and adjacent to the toxic-gas absorbent.

5. An outlet cap adapted to be removably attached to the gas outlet of a gas discharge passageway in an on-off valve provided on a container containing a toxic gas, said outlet cap comprising:

a bottom wall;

a peripheral wall extending from the bottom wall;

a gasket located on an inner surface of said bottom wall for sealing the gas outlet, said gasket being made of a material which does not chemically react with the toxic gas contained in the container to degrade the sealing property of the gasket, and said gasket having a recess centrally formed therein; and toxic-gas absorbing means fitted into the recess of the gasket, said toxic-gas absorbing means being exposed to said gas discharge passageway when said outlet cap is attached to said gas outlet, wherein the toxic-gas absorbing means consisting of a toxic-gas absorbent made of a material which can chemically react with the toxic gas to take and consume the toxic gas to thereby produce a solid product, and a barrier member which is permeable to the toxic gas and impermeable to the toxic-gas absorbent and the solid product produced, the barrier member being made of a sintered plate of metal and being fitted into the recess of the gasket on the side opposite to the bottom wall and adjacent to the toxic-gas absorbent.

6. The outlet cap as claimed in claim 5, wherein the said toxic-gas absorbent has a main reacting component which is selected from the group consisting of cupric hydroxide, manganese oxide, copper oxide, manganese carbonate and copper carbonate.

7. The outlet cap as claimed in claim 6, wherein said toxic-gas absorbent includes a material for adsorbing at least moisture.

8. An outlet cap adapted to be removably attached to the gas outlet of a gas discharge passageway in an on-off valve provided on a container containing a toxic gas, said outlet cap comprising:

a bottom wall;

a peripheral wall extending from the bottom wall;

a gasket located on an inner surface of said bottom wall for sealing the gas outlet, said gasket being made of a material which does not chemically react with the toxic gas contained in the container to degrade the sealing property of the gasket, and said gasket having a recess centrally formed therein; and toxic-gas absorbing means fitted into the recess of the gasket, said toxic-gas absorbing means being exposed to said gas discharge passageway when said outlet cap is attached to said gas outlet, wherein the toxic-gas absorbing means consisting of a toxic-gas adsorbent which is formed by a material absorbing at least the toxic gas and a barrier member which is permeable to the toxic gas, the barrier member being made of a sintered plate of metal and being fitted into the recess of the gasket on the side opposite to the bottom wall and adjacent to the toxic-gas absorbent.

* * * * *